United States Patent [19]
de Ramaix et al.

[11] 4,105,533
[45] Aug. 8, 1978

[54] ELECTRODIALYSIS CELL AND METHOD FOR PRODUCING CATIONIC PERMEABLE MEMBRANES USED THEREIN

[75] Inventors: Maurice Antoine de Ramaix, Hove; Aloijsius Gerardus Somers, Lier, both of Belgium

[73] Assignee: AGFA-GEVAERT N.V., Mortsel, Belgium

[21] Appl. No.: 694,436

[22] Filed: Jun. 9, 1976

[30] Foreign Application Priority Data

Jun. 12, 1975 [GB] United Kingdom ............... 25223/75

[51] Int. Cl.$^2$ ............................................. B01D 13/02
[52] U.S. Cl. .................... 204/301; 204/252; 204/260; 204/295
[58] Field of Search ............... 204/295, 252, 260, 301

[56] References Cited

U.S. PATENT DOCUMENTS

| | | | |
|---|---|---|---|
| 442,335 | 12/1890 | Roberts | 204/295 X |
| 578,073 | 3/1897 | Blumenberg, Jr. | 204/295 |
| 984,915 | 2/1911 | Heltzen | 204/295 X |
| 1,399,531 | 12/1921 | Walter | 204/295 |
| 1,982,224 | 11/1934 | Michel | 204/295 |
| 2,163,793 | 6/1939 | Logan | 204/260 X |
| 2,193,323 | 3/1940 | Nitzschke et al. | 204/260 X |
| 2,363,386 | 11/1944 | Bock | 204/260 X |

*Primary Examiner*—Arthur C. Prescott
*Attorney, Agent, or Firm*—William J. Daniel

[57] ABSTRACT

An electrodialysis cell intended to be used for the electrolytic rejuvenation of ferricyanide bleach bath into ferricyanide comprises a vessel which is made of carbon and which serves as anode, and a cathode, the space defined by both electrodes being separated by a cationic permeable membrane which is a wall made of asbestos cement which has been treated with a strong acid to remove a substantial part of the cement. The elements of the cell preferably have a cylindrical structure and are concentrically arranged with respect to each other.

15 Claims, 2 Drawing Figures

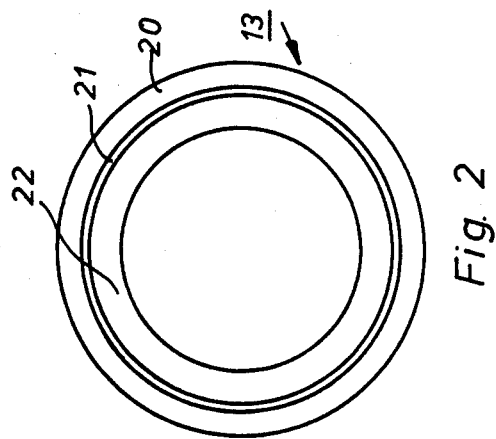
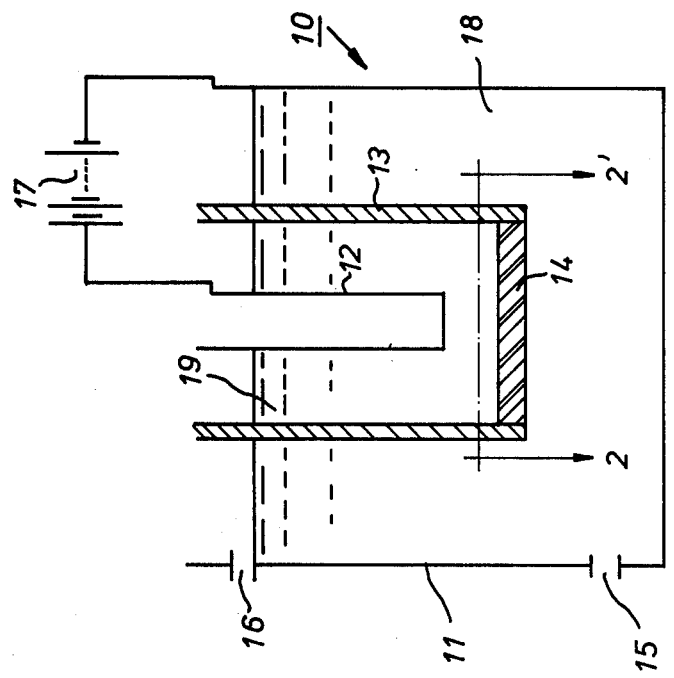

ELECTRODIALYSIS CELL AND METHOD FOR PRODUCING CATIONIC PERMEABLE MEMBRANES USED THEREIN

This invention is concerned with semi-permeable membranes, more particularly with membranes that are permeable to cations only, and with a method for the production thereof.

The renewed interest in the protection of the environment and in the recuperation and re-use of certain raw materials during the last years has led to the development of systems that contribute positively to the fulfilling of the above-mentioned objectives.

Photography is one of the branches of industry, which has to face the problem of pollution because of the fact that during development of photographic films relatively great quantities of chemicals are consumed, which after use are in general carried off to waste. As a consequence of their reducing properties these chemicals contribute to the pollution of rivers and streams and/or increase the load of the waste water treatment plants when sent to the sewer.

Many attemps have been made so far to rejuvenate spent ferricyanide bleach baths, as ferricyanide is expensive and may form poisonous derivatives under certain conditions. One of the methods used is electrolysis, according to which the ferricyanide bath is circulated through an electrolytic cell, whose anode and cathode sections are separated by a semi-permeable membrane, that allows the passage of but small cations, whereas it withholds anions. At the same time re-oxidation of the ferrocyanide into ferricyanide is carried out. Because potassium or sodium cations only can pass through the semi-permeable membrane and other chemicals are withheld, the formation of the hydroxide at the cathode has no adverse influence on the pH of the bleach bath. This results in a very important reduction of the quantities that have to be run to waste.

Thus it may be seen that electrolytic rejuvenation constitutes a very interesting tool in the fight for a cleaner environment.

The prior art electrolysis apparatus make use of a cationic permeable membrane, which comprises a foil-like support, in which ion-exchanging substituents have been provided.

An inconvenience of such membranes is the rather low resistance to mechanical load. Another inconvenience of such membranes is their swelling when brought in a liquid medium. As this swelling is irreproducible in nature, positioning problems may arise.

A third inconvenience of prior art membranes is the fact that two of their edges have to be sealed together in one way or the other when a tube-like structure is desired for the sake of compactness of the electrodialysis apparatus. Finally, the price of such membranes is relatively high. It is therefore an object of the invention to provide an electrodialysis cell with a semi-permeable membrane that does not show the above-mentioned drawbacks, and a method for preparing such membrane.

According to the invention, there is provided: an electrodialysis cell comprising a semi-permeable membrane of asbestos cement in which the content of cement decreases from the interior of the membrane towards at least one outer surface thereof whereby the said interior obtains an increased hardness and a decreased porosity as compared with said surface.

Preferably the membrane is in the form of a tube. Accordingly, the electrodialysis cell can be equipped with tube-like or ring-like electrodes so that the whole set can be manufactured as a small and compact unit. In case a membrane in the form of a tube is used, it is closed advantageously at one of its ends with a corrosion-resistant material, such as an epoxy resin in order to guarantee that the solutions present in the spaces defined by the anode and the membrane, and by the membrane and the cathode are not intermixed.

The invention also provides a method for producing a cationic permeable membrane, which method comprises the steps of:
  dipping a wall defining member of asbestos cement into a concentrated aqueous solution of a strong acid, thereby causing the removal of a substantial amount of the cement in the material at the surfaces of said wall defining member and
  subsequently rinsing said wall defining member to remove the residual acid.

When a membrane in the form of a tube is preferred, the method can be completed by providing the tube with a bottom consisting of a material that has sufficient mechanical strength and anti-corrosive properties.

A vessel obtained in this way can be used advantageously in an electrodialysis cell for the electrolytic rejuvenation of used ferricyanide bleach baths.

In this case the liquid bath composition to be treated is circulated in the space defined by the membrane and the anode, which is concentrically arranged in relation to it. The anode may consist of e.g. a tube made of pure graphite, which is fitted in a polyvinyl chloride vessel to ensure its impermeability.

The cathode may be in the form of a tube or other shape and be made of stainless steel.

For a better understanding of the nature of the invention, reference will be made to the following figures in which:

FIG. 1 represents an electrodialysis cell for electrolytic rejuvenation of ferricyanide bleach baths, and FIG. 2 is a sectional view through FIG. 1 according to the line 2–2'.

As can be seen in FIG. 1, an electrodialysis cell 10 comprises an anode 11 and a cathode 12. The space defined by said electrodes is divided into two separate sections by means of a semi-permeable membrane composed of a tube 13 made of asbestos cement, from which the cement has been removed to a substantial extend and which afterwards has been provided with a bottom 14 of an epoxy resin or other corrosion-resistant and impermeable material. The anode 11 made of carbon which may be in the form of a cylinder as represented, is provided with an inlet opening 15 and an outlet opening 16, through which the ferricyanide bleach bath 18 to be rejuvenated is pumped. In the space defined by the membrane and the cathode a suitable catholyte 19 such as a 40% solution of KOH is provided. When an electric DC-voltage is applied between anode 11 and the stainless steel cathode 12 also in cylindric form for reasons of compactness by means of a suitable DC-source 17, electrolytic rejuvenation of the ferricyanide occurs as a result of the conversion of ferrocyanide into ferricyanide. Simultaneously, the cations migrate towards the cathode where they cause a reaction resulting in an increase of the pH-value of the catholyte. As a result of the presence of the membrane, which allows the passage of said cations but withholds the passage of anions, this reaction can only occur in the space between the cathode 12 and the membrane. No adverse influence on the pH-value of the very bleach bath is encountered.

FIG. 2 represents a sectional view on an enlarged scale through the tube 13 forming the active part of the membrane. The tube 13 is made of asbestos cement, which after having been dipped in a strong acid for a given period of time, reveals the presence of three more or less pronounced zones: zones 20 and 22, from which the cement has been progressively removed, and zone 21 where this phenomenon did not arise.

The elimination of the cement results in a sponge-like structure on a microscale, so that the asbestos fibres lie free and may take part in the ion-exchanging process.

In a preferred mode of preparing the semi-permeable membrane according to the invention, a tube of asbestos cement is dipped for a period of twice 3 to twice 5 days, in a highly concentrated aqueous solution of hydrochlorid acid or another strong acid.

Preferably the tubes to be treated have a wall thickness varying between 9 and 13 millimeters.

After a first period of 3 or 5 days, the acid solution is replaced by a fresh one, and the same cycle is repeated. At the end of the period, the treated asbestos tube is rinsed with water to eliminate the residual traces of acid that are still present between the asbestos fibres.

After having been dried, the tube is sawn to units of appropriate length, whereafter each unit is provided with a bottom. This can be carried out most conveniently with a hardenable inert material e.g. an epoxy resin.

A typical example of manufacturing a semi-permeable membrane may comprise the following steps:

A tube of asbestos cement having a diameter of approximately 8 cm and a wall thickness of 13 mm is placed in a container comprising a solution of hydrochloric acid at a concentration of 33% and 25° C.

During the first period of six hours a temperature increase from 40° to 50° C is noticed, which is due to the exothermic reaction of dissolving the cement. After 6 hours the temperature gradually decreases again and after 3 days the initial conditions of 25° C are re-established.

After a period of 3 to 5 days, the hydrochloric acid solution is replaced by a fresh one, and the tube is kept within it for another period of 3 to 5 days.

After the end of the second 3 to 5 days' period, the tube is removed from the solution, thoroughly washed with water, and dried.

A sectional view through the tube reveals the presence of three zones, one at the outer periphery and one at the inner periphery of the tube from which practically all the cement has been dissolved away, and which have a relatively weak mechanical resistance and a harder zone lying between the two other zones with a thickness of approximately 1 to 5 millimeters.

The rinsed and dried tube is then provided with a bottom of an inert and hardenable material e.g. an epoxy resin or a material having analogous properties.

The asbestos cement tubes used for the manufacture of the semi-permeable membranes may be those that are sold under the trade name Eternit (Eternit is a registered trademark of Eternit Werke — Ludwig Hatschek, Vöcklabrück — Austria).

The semi-permeable membranes as obtained according to the aforementioned method are used advantageously in an electrolytic installation for the rejuvenation of potassium ferrocyanide, in which the said compound is converted into potassium ferricyanide.

In practice the asbestos-cement tubes have a length of about 33 cm, an outer diameter of 7.5 and an inner one of 6 cm. They are dipped in a highly concentrated hydrochloric acid solution after 2 days as the solution has to be replenished. Then they are rinsed thoroughly with water and dried at 70° C for at least 12 hours. Then 8 to 10 millimeters of epoxyresin are poured onto the bottom and allowed to harden for 36 hours.

Such a bottom is also provided in a tube made of graphite having an outer diameter of 13 cm, an inner diameter of 10 cm, and a length of 35 cm. A stainless steel anode is provided in the vessel formed by the semi-permeable membrane and the bottom. The vessel can be filled with a 40% by volume solution of potassium hydroxide.

The nature of the compounds that are involved in the process requires that the necessary conditions as to safety are guaranteed.

To this end, each tube as prepared by the method according to the invention is subjected to a series of tests to check its resistance to mechanical and chemical loads.

A first test consist in pouring an amount of a 10% by volume aqueous solution of potassium hydroxide into the vessel formed by the tube and its associated bottom. Further use of the device is refused, when after one hour traces of moisture are found on its outer periphery.

Another test consists in pouring a commercial potassium ferrocyanide solution in the vessel and measuring its electrical conductivity. The tests are carried out with the bleach bath G 462 manufactured by Agfa-Gevaert, Mortsel—Leverkusen. After one hour a conductivity of 0.5 Amps at a voltage of 5.5 Volts has to be measured.

Finally, the outer part of the vessel is subjected to an external pressure of 3 kg of water/sq.cm for one hour. There must be no traces at all in the interior.

An electrodialysis cell equipped with a semi-permeable membrane manufactured by a method according to the invention is capable of re-oxidizing 310 grams of potassium ferrocyanide into potassium ferricyanide per hour. For this purpose an electric DC-current of 21 amperes is needed. It will be clear to the skilled worker that the invention is not restricted to membranes in tube form, but that also planar members in asbestos cement can be used as well. It will also be appreciated that when use is made of plates, it is not necessary that they have been subjected to a cement-dissolving process over their entire surface(s), but that they may be treated only partially.

We claim:

1. In an electrodialysis cell having a cationic permeable membrane, the improvement wherein at least an operative portion of said membrane comprises a relatively low porosity interior region constituted of asbestos fibers contained in a cement matrix, opposite exterior strata each having a relatively high porosity microsponge structure with a substantial amount of exposed asbestos fibers and a substantially reduced cement content compared to said exterior region, and intervening regions in which the proportion of cement gradually increases toward said interior from said reduced exterior level with a corresponding gradual decrease in porosity.

2. An electrodialysis cell according to claim 1, in which said membrane is in the form of a hollow tube.

3. An electrodialysis cell according to claim 1, in which said tube is disposed in upright condition in said cell, said tube also being provided with an impermeable closure at one end.

4. An electrodialysis cell according to claim 1, in which the overall thickness of the operative area of said membrane lies between 9 and 13 millimeters.

5. An electrodialysis cell according to claim 1, in which said less porous interior region has a thickness ranging between 1 and 5 millimeters.

6. An electrodialysis cell according to claim 3, in which said impermeable closure is formed of an epoxy resin.

7. A method of making a cationic permeable membrane which comprises the steps of:

(1) immersing a body formed of a generally homogeneous mixture of asbestos fibers and cement and having exposed opposite surfaces spaced apart by a defined thickness, into a bath of a strong acid effective to dissolve said cement for a sufficient time as to dissolve a substantial amount of said cement in the exterior stratum adjacent each said surface and form a porous micro-sponge structure at said surface with substantial exposed asbestos fibers, while leaving the cement in an interior region of said body intact, the proportion of cement remaining in the regions intervening between said intact interior region and said surface substrata gradually increasing from the exterior to the interior with a corresponding decrease in porosity; and (2) rinsing the thus-treated body to remove residual acid and dissolved reaction products.

8. A method according to claim 7, in which said strong acid is hydrochloric acid.

9. A method according to claim 8, in which said hydrochloric acid has a concentration of 33% by weight.

10. A method according to claim 7, in which the solution of a strong acid is replaced by a fresh solution after a first period of time, whereinafter the removal of the cement continues for a second period of time.

11. A method according to claim 10, in which said second period of time is as long as said first period.

12. A method according to claim 7, in which said wall-defining member is in the form of a tube.

13. A method according to claim 12, which further comprises the step of providing a bottom of an impermeable material in one of the end openings of said tube.

14. An electrodialysis cell for rejuvenating ferricyanide bleach bath into ferrocyanide, said electrodialysis cell comprising:
a cathode,
an anode,
a semi-permeable membrane located in the space confined by said cathode and said anode,
a source of DC voltage, the positive pole of which is connected to said anode, and the negative pole to said cathode,
means to circulate the ferricyanide bath to be rejuvenated in the space confined by said anode and said semi-permeable membrane,
a catholyte located in the space confined by said semi-permeable membrane and said cathode in which said semi-permeable membrane is a semi-permeable membrane having at least an operative portion comprising a relatively low porosity interior region constituted of asbestos fibers contained in a cement matrix, opposite exterior strata each having a relatively high porosity micro-sponge structure with a substantial amount of exposed asbestos fibers and a substantially reduced cement content compared to said exterior region, and intervening regions in which the proportion of cement gradually increases toward said interior from said reduced exterior level with a corresponding gradual decrease in porosity.

15. An electrodialysis cell according to claim 14, in which said cathode, said anode, and said semi-permeable membrane have a cylindrical configuration and are concentrically arranged with respect to each other.

* * * * *